United States Patent
Morgan et al.

(10) Patent No.: US 11,408,352 B2
(45) Date of Patent: Aug. 9, 2022

(54) REVERSE-FLOW GAS TURBINE ENGINE

(71) Applicant: PRATT & WHITNEY CANADA CORP., Longueuil (CA)

(72) Inventors: Keith Morgan, Westmount (CA); Robert Peluso, Saint-Laurent (CA); Ghislain Plante, Verdun (CA); Eugene Gekht, Brossard (CA); Eric Durocher, Boucherville (CA); Jean Dubreuil, Boucherville (CA); Stephen Mah, Brossard (CA); Philippe Beauchesne-Martel, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/077,310

(22) Filed: Oct. 22, 2020

(65) Prior Publication Data
US 2021/0270183 A1 Sep. 2, 2021

Related U.S. Application Data

(62) Division of application No. 15/266,321, filed on Sep. 15, 2016.

(51) Int. Cl.
  *F02C 7/32* (2006.01)
  *F02C 3/14* (2006.01)
  (Continued)

(52) U.S. Cl.
  CPC ............. *F02C 7/32* (2013.01); *F01D 1/26* (2013.01); *F02C 3/04* (2013.01); *F02C 3/067* (2013.01);
  (Continued)

(58) Field of Classification Search
  CPC . F02K 3/06; F02K 3/025; F02K 3/062; F02K 3/065; F02C 3/09; F02C 3/10; F02C 7/36
  See application file for complete search history.

(56) References Cited

U.S. PATENT DOCUMENTS

| | | | |
|---|---|---|---|
| 2,548,975 | A | 4/1951 | Hawthorne |
| 2,747,367 | A | 5/1956 | Savin |

(Continued)

FOREIGN PATENT DOCUMENTS

| | | |
|---|---|---|
| CA | 2562290 | 10/2013 |
| CA | 2970386 | 1/2018 |

(Continued)

OTHER PUBLICATIONS

A New Approach to Turboshaft Engine Growth, M. A. Compagnon, General Electric Company, Lynn,Massachusetts pp. 80-41-1 to 80-41-6, May 13, 1980.

(Continued)

*Primary Examiner* — Ehud Gartenberg
*Assistant Examiner* — Henry Ng
(74) *Attorney, Agent, or Firm* — Getz Balich LLC

(57) ABSTRACT

A gas turbine engine has a first spool having a low pressure compressor section in fluid communication with an air inlet, the low pressure compressor section including a first plurality of variable guide vanes therein, and a low pressure turbine section drivingly engaged to the low pressure compressor section. A second spool has a high pressure compressor section in fluid communication with the low pressure compressor section to receive pressurized air therefrom, the high pressure compressor section including a second plurality of variable guide vanes at an entry thereof, and a high pressure turbine section drivingly engaged to the high pressure compressor section, the high pressure turbine section disposed upstream of the low pressure turbine section and in (Continued)

fluid communication therewith. An output drive shaft drivingly engages the low pressure turbine section and is adapted to drivingly engage a rotatable load of the gas turbine engine.

17 Claims, 3 Drawing Sheets

(51) Int. Cl.
*F02C 6/20* (2006.01)
*F02C 3/04* (2006.01)
*F02C 3/067* (2006.01)
*F02C 3/113* (2006.01)
*F02C 7/36* (2006.01)
*F01D 1/26* (2006.01)
*F04D 25/02* (2006.01)

(52) U.S. Cl.
CPC .............. *F02C 3/113* (2013.01); *F02C 3/145* (2013.01); *F02C 6/206* (2013.01); *F02C 7/36* (2013.01); *F04D 25/024* (2013.01); *F05D 2220/32* (2013.01); *F05D 2250/38* (2013.01); *F05D 2260/40* (2013.01); *Y02T 50/60* (2013.01)

(56) References Cited

U.S. PATENT DOCUMENTS

| | | | |
|---|---|---|---|
| 2,929,207 A | 3/1960 | Peterson | |
| 2,955,424 A | 10/1960 | Hryniszak | |
| 2,984,977 A | 5/1961 | Embree | |
| 3,152,443 A | 10/1964 | Newland | |
| 3,170,292 A | 2/1965 | Howes | |
| 3,204,406 A | 9/1965 | Howes | |
| 3,209,536 A | 10/1965 | Howes | |
| 3,255,825 A | 6/1966 | Mouille et al. | |
| 3,488,947 A | 1/1970 | Miller et al. | |
| 3,529,419 A | 9/1970 | Reed | |
| 3,762,161 A | 10/1973 | Pennig | |
| 3,874,811 A | 4/1975 | Dennison | |
| 4,055,949 A | 11/1977 | Boudigues | |
| 4,141,212 A | 2/1979 | Koschier | |
| 4,251,987 A | 2/1981 | Adamson | |
| 4,498,291 A | 2/1985 | Jefferey | |
| 4,531,694 A | 7/1985 | Soloy | |
| 4,611,464 A | 9/1986 | Hetzer et al. | |
| 4,685,286 A | 8/1987 | Hetzer et al. | |
| 4,817,382 A | 4/1989 | Rudolph et al. | |
| 4,864,812 A | 9/1989 | Rodgers | |
| 5,159,808 A | 11/1992 | Kast | |
| 5,161,364 A | 11/1992 | Bruun et al. | |
| 5,309,708 A | 5/1994 | Stewart | |
| 5,535,963 A | 7/1996 | Lehl | |
| 6,041,589 A | 3/2000 | Giffin, III et al. | |
| 6,082,967 A | 7/2000 | Loisy | |
| 6,247,668 B1 | 6/2001 | Reysa et al. | |
| 6,855,089 B2 | 2/2005 | Poulin | |
| 6,865,891 B2 | 3/2005 | Walsh et al. | |
| 6,895,741 B2 | 5/2005 | Rago et al. | |
| 7,055,303 B2 | 6/2006 | Macfarlane et al. | |
| 7,168,913 B2 | 1/2007 | Lardellier | |
| 7,500,365 B2 | 3/2009 | Suciu et al. | |
| 7,552,591 B2 | 6/2009 | Bart et al. | |
| 7,690,185 B2 | 4/2010 | Linet et al. | |
| 7,707,909 B2 | 5/2010 | Linet et al. | |
| 7,762,084 B2 | 7/2010 | Martis | |
| 8,176,725 B2 | 5/2012 | Norris et al. | |
| 8,209,952 B2 | 7/2012 | Ress, Jr. | |
| 8,220,245 B1 | 7/2012 | Papandreas | |
| 8,459,038 B1 | 6/2013 | Lickfold et al. | |
| 8,516,789 B2 | 8/2013 | Kupratis | |
| 8,568,089 B2 | 10/2013 | Lemmers, Jr. et al. | |
| 8,621,871 B2 | 1/2014 | McCune et al. | |
| 8,794,922 B2 | 8/2014 | Bart et al. | |
| 8,853,878 B1 | 10/2014 | White | |
| 9,062,611 B2 | 6/2015 | Sheridan | |
| 9,126,691 B2 | 9/2015 | Cloft | |
| 9,145,834 B2 | 9/2015 | Frost et al. | |
| 9,239,004 B2 | 1/2016 | Kupratis et al. | |
| 9,322,341 B2 | 4/2016 | Belleville | |
| 9,328,667 B2 | 5/2016 | MacFarlane | |
| 9,341,121 B2 | 5/2016 | Kupratis | |
| 9,353,848 B2 | 5/2016 | Blewett et al. | |
| 9,512,784 B2 | 12/2016 | Morgan et al. | |
| 9,828,911 B2 | 1/2017 | Burghardt | |
| 9,719,465 B2 | 8/2017 | Suciu et al. | |
| 9,745,860 B1 | 8/2017 | Haskin | |
| 9,752,500 B2 | 9/2017 | Ullyott et al. | |
| 9,784,182 B2 | 10/2017 | Dhanuka | |
| 9,819,292 B2 | 11/2017 | Thatcher | |
| 9,890,704 B2 | 2/2018 | Speak et al. | |
| 9,926,849 B2 | 3/2018 | Frost et al. | |
| 9,932,858 B2 | 4/2018 | Miller | |
| 10,054,001 B2 | 8/2018 | Beutin et al. | |
| 10,072,570 B2 | 9/2018 | Kupratis | |
| 10,094,295 B2 | 10/2018 | Ullyott et al. | |
| 10,125,722 B2 | 11/2018 | Kupratis et al. | |
| 2005/0060983 A1 | 3/2005 | Lardellier | |
| 2006/0010152 A1 | 1/2006 | Catalano | |
| 2006/0137355 A1 | 6/2006 | Welch et al. | |
| 2007/0240427 A1 | 10/2007 | Ullyott | |
| 2008/0081733 A1 | 4/2008 | Hattenbach | |
| 2008/0138195 A1 | 6/2008 | Kern | |
| 2008/0148881 A1 | 6/2008 | Moniz et al. | |
| 2009/0015011 A1 | 1/2009 | Colin | |
| 2009/0188334 A1 | 7/2009 | Merry | |
| 2009/0288421 A1 | 11/2009 | Zeiner | |
| 2009/0322088 A1 | 12/2009 | Dooley | |
| 2010/0164234 A1 | 7/2010 | Bowman | |
| 2010/0180568 A1 | 7/2010 | Sachs | |
| 2010/0212285 A1 | 8/2010 | Negulescu | |
| 2010/0281875 A1 | 11/2010 | Price | |
| 2011/0056208 A1 | 3/2011 | Norris | |
| 2011/0171030 A1 | 7/2011 | Swift | |
| 2011/0284328 A1 | 11/2011 | Brandt | |
| 2013/0031912 A1 | 2/2013 | Finney | |
| 2013/0056982 A1 | 3/2013 | Gozdawa | |
| 2013/0098066 A1 | 4/2013 | Gallet et al. | |
| 2013/0139518 A1 | 6/2013 | Morgan | |
| 2013/0145769 A1 | 6/2013 | Norris et al. | |
| 2013/0018605 A1 | 7/2013 | Sheridan et al. | |
| 2013/0186058 A1 | 7/2013 | Sheridan et al. | |
| 2013/0255224 A1 | 10/2013 | Kupratis | |
| 2014/0069107 A1 | 3/2014 | Macfarlane | |
| 2014/0130352 A1 | 5/2014 | Buldtmann et al. | |
| 2014/0150401 A1 | 6/2014 | Venter | |
| 2014/0250862 A1 | 9/2014 | Suciu et al. | |
| 2014/0252160 A1 | 9/2014 | Suciu et al. | |
| 2014/0255147 A1 | 9/2014 | Root | |
| 2014/0256494 A1 | 9/2014 | Lewis | |
| 2014/0260295 A1 | 9/2014 | Ullyott et al. | |
| 2014/0290265 A1 | 10/2014 | Ullyott et al. | |
| 2014/0297155 A1 | 10/2014 | Chen | |
| 2015/0013307 A1 | 1/2015 | Burghardt | |
| 2015/0150401 A1 | 6/2015 | Venter | |
| 2015/0167549 A1 | 6/2015 | Ribarov et al. | |
| 2015/0233302 A1* | 8/2015 | Levasseur ................ F02C 7/32 60/726 |
| 2015/0337738 A1 | 11/2015 | Suciu et al. | |
| 2015/0369123 A1 | 12/2015 | Hanrahan | |
| 2015/0377125 A1 | 12/2015 | Kupratis et al. | |
| 2016/0040601 A1 | 2/2016 | Frost et al. | |
| 2016/0090871 A1 | 3/2016 | Olsen | |
| 2016/0169118 A1 | 6/2016 | Duong | |
| 2016/0201490 A1 | 7/2016 | Scott | |
| 2016/0201684 A1 | 7/2016 | Schwarz et al. | |
| 2016/0208690 A1 | 7/2016 | Zimmitti | |
| 2016/0215694 A1 | 7/2016 | Brostmeyer | |
| 2016/0230843 A1 | 8/2016 | Duong | |
| 2016/0245185 A1 | 8/2016 | Lamarre et al. | |
| 2016/0281611 A1* | 9/2016 | Stockwell ............ B64C 11/305 |
| 2016/0290226 A1 | 10/2016 | Roberge | |

(56) References Cited

U.S. PATENT DOCUMENTS

| | | |
|---|---|---|
| 2016/0305261 A1 | 10/2016 | Orosa |
| 2016/0319845 A1 | 11/2016 | Molnar |
| 2016/0333791 A1 | 11/2016 | Snyder et al. |
| 2016/0341214 A1 | 11/2016 | O'Toole |
| 2017/0016399 A1 | 1/2017 | Bedrine et al. |
| 2017/0058786 A1* | 3/2017 | Stockwell .................. F02C 9/26 |
| 2017/0108084 A1 | 4/2017 | Chmylkowski |
| 2017/0122122 A1 | 5/2017 | Lepretre |
| 2017/0152055 A1 | 6/2017 | Mercier-Calvairac et al. |
| 2017/0211477 A1 | 7/2017 | Menheere |
| 2017/0211484 A1 | 7/2017 | Sheridan |
| 2017/0191413 A1 | 8/2017 | Haskin |
| 2017/0241336 A1* | 8/2017 | Jones ........................ F02C 9/18 |
| 2017/0247114 A1 | 8/2017 | Moulon et al. |
| 2017/0298816 A1* | 10/2017 | Razak .................... F02C 3/113 |
| 2017/0298826 A1* | 10/2017 | Ryznic ..................... F02C 3/04 |
| 2017/0305541 A1 | 10/2017 | Vallart et al. |
| 2017/0306841 A1 | 10/2017 | Skertic |
| 2017/0314469 A1 | 11/2017 | Roever |
| 2017/0314474 A1 | 11/2017 | Wotzak |
| 2017/0327241 A1 | 11/2017 | Mitrovic |
| 2017/0356347 A1 | 12/2017 | Scothern et al. |
| 2017/0356452 A1 | 12/2017 | Mastro |
| 2017/0370284 A1 | 12/2017 | Harvey et al. |
| 2018/0016989 A1 | 1/2018 | Abe et al. |
| 2018/0023480 A1 | 1/2018 | Lefebvre |
| 2018/0023481 A1 | 1/2018 | Lefebvre |
| 2018/0023482 A1 | 1/2018 | Lefebvre |
| 2018/0045068 A1 | 2/2018 | Brinson et al. |
| 2018/0050809 A1* | 2/2018 | Colavincenzo ........... F02C 9/18 |
| 2018/0058330 A1 | 3/2018 | Munevar |
| 2018/0073428 A1 | 3/2018 | Morgan |
| 2018/0073429 A1 | 3/2018 | Dubreuil |
| 2018/0073438 A1 | 3/2018 | Durocher et al. |
| 2018/0080378 A1 | 3/2018 | Alecu |
| 2018/0135522 A1 | 5/2018 | Mitrovic et al. |
| 2018/0149091 A1 | 5/2018 | Howell et al. |
| 2018/0163640 A1 | 6/2018 | Dubreuil et al. |
| 2018/0171815 A1 | 6/2018 | Suciu et al. |
| 2018/0172012 A1 | 6/2018 | Plante et al. |
| 2018/0202310 A1 | 7/2018 | Suciu et al. |
| 2018/0202368 A1 | 7/2018 | Suciu et al. |
| 2018/0208322 A1 | 7/2018 | Tantot |
| 2018/0216525 A1 | 8/2018 | Plante et al. |
| 2018/0223739 A1 | 8/2018 | Dubreuil et al. |
| 2018/0283281 A1 | 10/2018 | Veilleux, Jr. et al. |
| 2018/0291817 A1 | 10/2018 | Suciu et al. |
| 2018/0313274 A1 | 11/2018 | Suciu et al. |
| 2018/0347471 A1 | 12/2018 | Wotzak |

FOREIGN PATENT DOCUMENTS

| | | |
|---|---|---|
| CA | 2970389 | 1/2018 |
| CA | 2975558 | 6/2018 |
| EP | 0103370 | 3/1984 |
| EP | 0860593 | 9/2003 |
| EP | 1908938 | 4/2004 |
| EP | 2226487 | 9/2010 |
| EP | 2295763 | 3/2011 |
| EP | 2320067 | 5/2011 |
| EP | 1959114 | 5/2012 |
| EP | 2602458 | 6/2013 |
| EP | 2728140 | 5/2014 |
| EP | 3043056 | 7/2016 |
| EP | 3273031 | 1/2018 |
| EP | 3273034 | 1/2018 |
| EP | 3283369 | 2/2018 |
| EP | 3273032 | 4/2018 |
| EP | 3309371 | 4/2018 |
| FR | 991975 | 10/1951 |
| FR | 1262452 | 5/1961 |
| FR | 1594317 | 6/1970 |
| GB | 713839 | 8/1954 |
| GB | 794198 | 4/1958 |
| GB | 1102591 | 2/1968 |
| WO | 95/02120 A1 | 1/1995 |
| WO | 02081883 W | 10/2002 |
| WO | 2005/061873 | 7/2005 |
| WO | 2008045068 | 4/2008 |
| WO | 2015033336 | 3/2015 |
| WO | 2015122948 | 8/2015 |
| WO | 20150122948 | 8/2015 |
| WO | 2017/198999 | 11/2017 |

OTHER PUBLICATIONS

U.S. Appl. No. 17/077,310.

* cited by examiner

REVERSE-FLOW GAS TURBINE ENGINE

CROSS-REFERENCE TO RELATED APPLICATIONS

The present application is a divisional of U.S. patent application Ser. No. 15/266,321 filed Sep. 15, 2016, the entire contents of which are incorporated herein by reference.

TECHNICAL FIELD

The application relates generally to gas turbine engines and, more particularly, to gas turbine engines with a reverse flow core.

BACKGROUND OF THE ART

Reverse-flow gas turbine engines draw air into a central core of the engine near a rear portion of the engine, and exhaust combustion gases from a front portion of the engine. Gases therefore flow through the core from the rear to the front of the engine.

In some conventional reverse-flow engines, air is drawn into the core and compressed with a single compressor stage driven by a first turbine stage. A second turbine stage, separate from the first turbine stage and rotating a separate shaft, provides the rotational output of the engine. The first turbine stage is therefore performing all of the work to compress the air, which may affect the overall efficiency of the engine.

SUMMARY

In one aspect, there is provided a gas turbine engine, comprising: a first spool having a low pressure compressor section in fluid communication with an air inlet, the low pressure compressor section including a first plurality of variable guide vanes in the low pressure compressor section, and a low pressure turbine section drivingly engaged to the low pressure compressor section; a second spool having a high pressure compressor section in fluid communication with the low pressure compressor section to receive pressurized air therefrom, the high pressure compressor section including a second plurality of variable guide vanes at an entry of the high pressure compressor section, and a high pressure turbine section drivingly engaged to the high pressure compressor section, the high pressure turbine section disposed upstream of the low pressure turbine section and in fluid communication therewith; and an output drive shaft drivingly engaged to the low pressure turbine section, the drive shaft adapted to drivingly engage a rotatable load of the gas turbine engine.

In another aspect, there is provided a method of operating a gas turbine engine, comprising: drawing air into a core of the engine through a low pressure compressor section through a first plurality of variable guide vanes disposed in the low pressure compressor section and then through a high pressure compressor section located downstream from the low pressure compressor section, the high pressure compressor section including a second plurality of variable guide vanes disposed at an entry of the high pressure compressor section, to provide pressurized air; igniting a mixture of the pressurized air and fuel to generate combustion gases; directing the combustion gases through a high pressure turbine section and then through a low pressure turbine section to drive the high pressure turbine section and the low pressure turbine section using the combustion gases; driving the high pressure compressor section with the high pressure turbine section; and driving the low pressure compressor section and a rotatable load with the low pressure turbine section, the low pressure turbine section and the high pressure turbine section rotating independently from one another.

In yet another aspect, there is provided a gas turbine engine, comprising: an output drive shaft having a front end configurable to drivingly engage a rotatable load; a low pressure turbine section and a low pressure compressor section drivingly engaged to the drive shaft, the low pressure turbine section disposed downstream of the low pressure compressor section, the low pressure compressor section including a first plurality of variable guide vanes at an inlet of the low pressure compressor section; a high pressure shaft rotatable independently of the drive shaft; and a high pressure turbine section and a high pressure compressor section drivingly engaged to the high pressure shaft, the high pressure compressor section disposed downstream of the low pressure compressor section and in fluid communication therewith, the high pressure compressor section including a second plurality of variable guide vanes at an inlet of the high pressure compressor section, and the high pressure turbine section disposed upstream of the low pressure turbine section and in fluid communication therewith; wherein during operation of the engine, air flows through the first plurality of variable guide vanes of the low pressure compressor, and then through the second plurality of variable guide vanes of the high pressure compressor, and combustion gases flow downstream through the high pressure and low pressure turbine sections.

DESCRIPTION OF THE DRAWINGS

Reference is now made to the accompanying figures in which.

DETAILED DESCRIPTION

Figure 1:
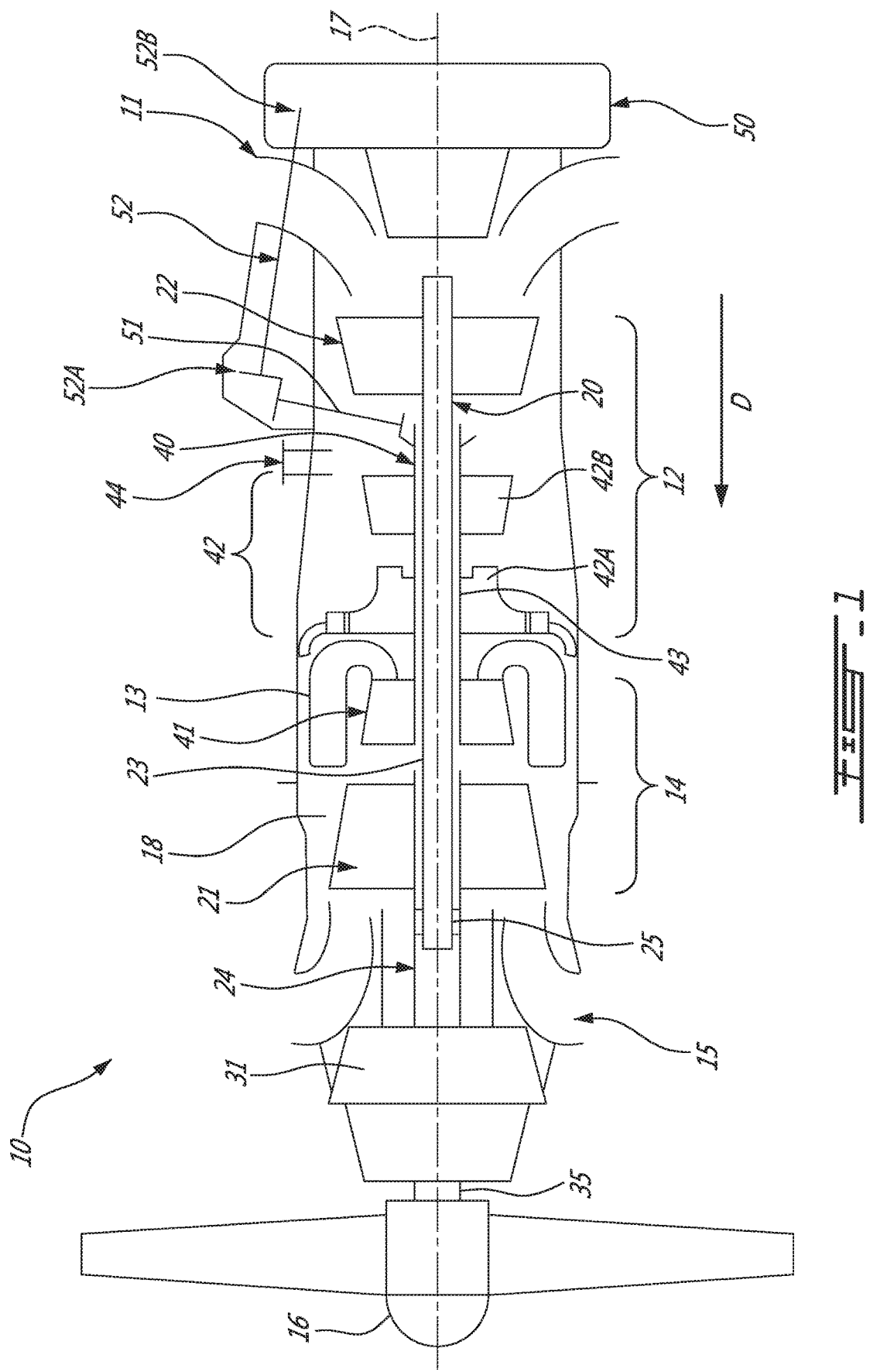
FIG. 1 is a schematic cross-sectional view of a gas turbine engine, according to an embodiment of the present disclosure.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the gas turbine engine 10. The engine 10 includes a propeller 16 which provides thrust for flight and taxiing. The gas turbine engine 10 has a longitudinal center axis 17.

The gas turbine engine 10 (sometimes referred to herein simply as "engine 10") has a central core 18 through which gases flow and which includes some of the turbomachinery of the engine 10. The engine 10 is a "reverse-flow" engine 10 because gases flow through the core 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the core 18 of the engine 10 disclosed herein can be better appreciated by considering that the gases flow through the core 18 in the same direction D as the one along which the engine 10 travels during flight. Stated differently, gases flow through the engine 10 from a rear end thereof towards the propeller 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to the propeller 16. Similarly, a component of the engine 10 that is "aft" of another component is arranged within the engine 10 such that it is further away from the propeller 16.

Still referring to FIG. 1, the engine 10 has multiple spools which perform compression to pressurize the air received through the air inlet 11, and which extract energy from the combustion gases before they exit the core 18 via the exhaust outlet 15.

A first spool 20 includes at least one component to compress the air that is part of the compressor section 12, and at least one component to extract energy from the combustion gases that is part of the turbine section 14. More particularly, the first spool 20 has a low pressure turbine section 21 which extracts energy from the combustion gases, and which is drivingly engaged (e.g. directly connected) to a low pressure compressor section 22 for pressurizing the air. The low pressure turbine section 21 (sometimes referred to herein simply as "LP turbine section 21") drives the low pressure compressor section 22 (sometimes referred to herein simply as "LPC section 22") thereby causing the LPC section 22 to pressurize the air. Both the LP turbine section 21 and the LPC section 22 are disposed along the center axis 17. In the depicted embodiment, both the LP turbine section 21 and the LPC section 22 are axial rotatable components having an axis of rotation that is coaxial with the center axis 17. They can each include one or more stages of rotors and stators, depending upon the desired engine thermodynamic cycle, for example.

In the depicted embodiment, the first spool 20 has a power shaft 23 which mechanically couples the LP turbine section 21 and the LPC section 22, and extends between them. The power shaft 23 is coaxial with the center axis 17 of the engine 10. The power shaft 23 allows the LP turbine section 21 to drive the LPC section 22 during operation of the engine 10. The power shaft 23 is not limited to the configuration depicted in FIG. 1, and can also mechanically couple the LP turbine section 21 and the LPC section 22 in any other suitable way provided that it transmits a rotational drive from the LP turbine section 21 to the LPC section 22. For example, the power shaft 23 can be combined with a geared LPC section 22 to allow the LPC section 22 to run at a different rotational speed from the LP turbine section 21. This can provide more flexibility in the selection of design points for the LPC section 22.

The LP turbine section 21 is forward of the LPC section 22. The LP turbine section 21 is also aft of the exhaust outlet 15. The LPC section 22 is forward of the air inlet 11. This arrangement of the LP turbine section 21 and the LPC section 22 provides for a reverse-flow engine 10 that has one or more low pressure compressors located at the rear of the engine 10 which are driven by one or more low pressure turbines located at the front of the engine 10.

Still referring to FIG. 1, the engine 10 includes an output drive shaft 24. The drive shaft 24 extends forwardly from the LP turbine section 21 and is drivingly engaged thereto. The drive shaft 24 is distinct from the power shaft 23 and mechanically coupled thereto to be driven by the LP turbine section 21. In the depicted embodiment, the drive shaft 24 and the power shaft 23 are coaxial and interconnected. FIG. 1 shows that the power and drive shafts 23,24 are interconnected with a spline 25. The spline 25, which can include ridges or teeth on the drive shaft 24 that mesh with grooves in the power shaft 23 (or vice versa), allows for the transfer of torque between the drive shaft 24 and the power shaft 23. In the depicted embodiment, the power shaft 23 lies at least partially within the drive shaft 24, such that the spline 25 transfers the rotational drive or torque generated by the LP turbine section 21 from the drive shaft 24 to the power shaft 23. The spline 25 can operate so that the power shaft 23 and the drive shaft 24 rotate at the same rotational speed. Other mechanical techniques can also be used to interconnect the power and drive shafts 23,24. For example, the power and drive shafts 23,24 can be interconnected by curvic coupling, pins, and interference fits. Other configurations of the drive shaft 24 and the power shaft 23 are also possible. For example, the drive shaft 24 and the power shaft 23 can be a single shaft driven by the LP turbine section 21. The drive shaft 24 therefore transfers the rotational output of the LP turbine section 21 in a forward direction to drive another component.

A rotatable load, which in the embodiment shown includes the propeller 16, is mountable to the engine 10, and when mounted, is drivingly engaged (e.g. directly connected) to the LP turbine section 21, and is located forward of the LP turbine section 21. In such a configuration, during operation of the engine 10, the LP turbine section 21 drives the rotatable load such that a rotational drive produced by the LP turbine section 21 is transferred to the rotatable load. The rotatable load can therefore be any suitable component, or any combination of suitable components, that is capable of receiving the rotational drive from the LP turbine section 21, as now described.

In the embodiment shown, a reduction gearbox 31 (sometimes referred to herein simply as "RGB 31") is mechanically coupled to a front end of the drive shaft 24, which extends between the RGB 31 and the LP turbine section 21. The RGB 31 processes and outputs the rotational drive transferred thereto from the LP turbine section 21 via the drive shaft 24 through known gear reduction techniques. The RGB 31 allows for the propeller 16 to be driven at its optimal rotational speed, which is different from the rotational speed of the LP turbine section 21.

The propeller 16 is mechanically coupled to the output of the RGB 31 via a propeller shaft 35. The propeller shaft 35 allows the rotational drive outputted by the RGB 31 during operation of the engine 10 to be transferred to the propeller 16 to provide propulsion during flight. In an alternate embodiment where the engine 10 is a turboshaft, the propeller 16 is omitted and the rotational load (which may include, but is not limited to, helicopter main rotor(s) and/or tail rotor(s), propeller(s) for a tilt-rotor aircraft, pump(s), generator(s), gas compressor(s), marine propeller(s), etc.) is driven by the LP turbine section 21 via the RGB 31, or the propeller 16 and RGB 31 are omitted such that the output of the engine 10 is provided by the output drive shaft 24.

The drive shaft 24 extending forward of the LP turbine section 21 and the power shaft 23 extending aft of the LP turbine section 21 provide the engine 10 with bidirectional drive. Modularity criteria for gas turbine engines may require the use of distinct shafts 23,24 that are directly or indirectly connected together. Alternately, the power shaft 23 and the drive shaft 24 can be integral with one another, with a first segment of the integral output shaft extending between the LPC section 22 and the LP turbine section 21, and a second segment extending between the rotatable load and the LP turbine section 21. Whether the power shaft 23 is integral with the drive shaft 24 or distinct therefrom, the LP turbine section 21 provides rotational drive outputted at each end of the power shaft 23.

In light of the preceding, it can be appreciated that the LP turbine section 21 drives both the rotatable load and the LPC section 22. Furthermore, the rotatable load, when mounted to the engine 10, and the LPC section 22 are disposed on opposite ends of the LP turbine section 21. It can thus be appreciated that one or more low pressure turbines are used to drive elements in front of the low pressure turbines (e.g. propeller 16, RGB 31, etc.) as well as to drive elements to the rear of the low pressure turbines (e.g. LPC section 22). This configuration of the LP turbine section 21 allows it to simultaneously drive the rotatable load and the LPC section 22, if desired. As will be discussed in greater detail below, this arrangement of the rotatable load, the LP turbine section 21, and the LPC section 22 can contribute to improving the thermodynamic efficiency of the engine 10.

Still referring to FIG. 1, the engine 10 includes a second spool 40 with at least one component to compress the air that is part of the compressor section 12, and at least one component to extract energy from the combustion gases that is part of the turbine section 14. The second spool 40 is also disposed along the center axis 17 and includes a high pressure turbine section 41 drivingly engaged (e.g. directly connected) to a high pressure compressor section 42 by a high pressure shaft 43 rotating independently of the power shaft 23. Similarly to the LP turbine section 21 and the LPC section 22, the high pressure turbine section 41 (sometimes referred to herein simply as "HP turbine section 41") and the high pressure compressor section 42 (sometimes referred to herein simply as "HPC section 42") can include axial rotary components. They can also each include one or more stages of rotors and stators, depending upon the desired engine thermodynamic cycle, for example. In the depicted embodiment, the HPC section 42 includes a centrifugal compressor 42A or impeller and an axial compressor 42B, both of which are driven by the HP turbine section 41. During operation of the engine 10, the HP turbine section 41 drives the HPC section 42.

The HP turbine section 41 is aft of the LP turbine section 21, and forward of the combustor 13. The HPC section 42 is aft of the combustor 13, and forward of the LPC section 22. From this arrangement of the HP turbine section 41 and the HPC section 42, it can be appreciated that during operation of the engine 10, the LPC section 22 driven by the LP turbine section 21 feeds pressurized air to the HPC section 42. Therefore, the pressurized air flow produced by the LPC section 22 is provided to the HPC section 42 and contributes to the work of both the LP turbine section 21 and the HP turbine section 41.

It can thus be appreciated that the presence of the above-described first and second spools 20,40 provides the engine 10 with a "split compressor" arrangement. More particularly, some of the work required to compress the incoming air is transferred from the HPC section 42 to the LPC section 22. In other words, some of the compression work is transferred from the HP turbine section 41 to the more efficient LP turbine section 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HPC section 42 to the LPC section 22 contrasts with some conventional reverse-flow engines, in which the high pressure compressor (and thus the high pressure turbine) perform all of the compression work.

In light of the preceding, it can be appreciated that the LP turbine section 21 is the "low-speed" and "low pressure" turbine section when compared to the HP turbine section 41, which is sometimes referred to as the "gas generator". The LP turbine section 21 is sometimes referred to as a "power turbine" section. The turbine rotors of the HP turbine section 41 spin at a higher rotational speed than the turbine rotors of the LP turbine section 21 given the closer proximity of the HP turbine section 41 to the outlet of the combustor 13. Consequently, the compressor rotors of the HPC section 42 may rotate at a higher rotational speed than the compressor rotors of the LPC section 22. The engine 10 shown in FIG. 1 is thus a "two-spool" engine 10.

The HP turbine section 41 and the HPC section 42 can have any suitable mechanical arrangement to achieve the above-described split compressor functionality. For example, and as shown in FIG. 1, the second spool 40 includes a high pressure shaft 43 extending between the HPC section 42 and the HP turbine section 41. The high pressure shaft 43 is coaxial with the power shaft 23 and rotatable relative thereto. The relative rotation between the high pressure shaft 43 and the power shaft 23 allow the shafts 23,43 to rotate at different rotational speeds, thereby allowing the HPC section 42 and the LPC section 22 to rotate at different rotational speeds. The high pressure shaft 43 can be mechanically supported by the power shaft 23 using bearings or the like. In the depicted embodiment, the power shaft 23 is at least partially disposed within the high pressure shaft 43.

Figure 3:
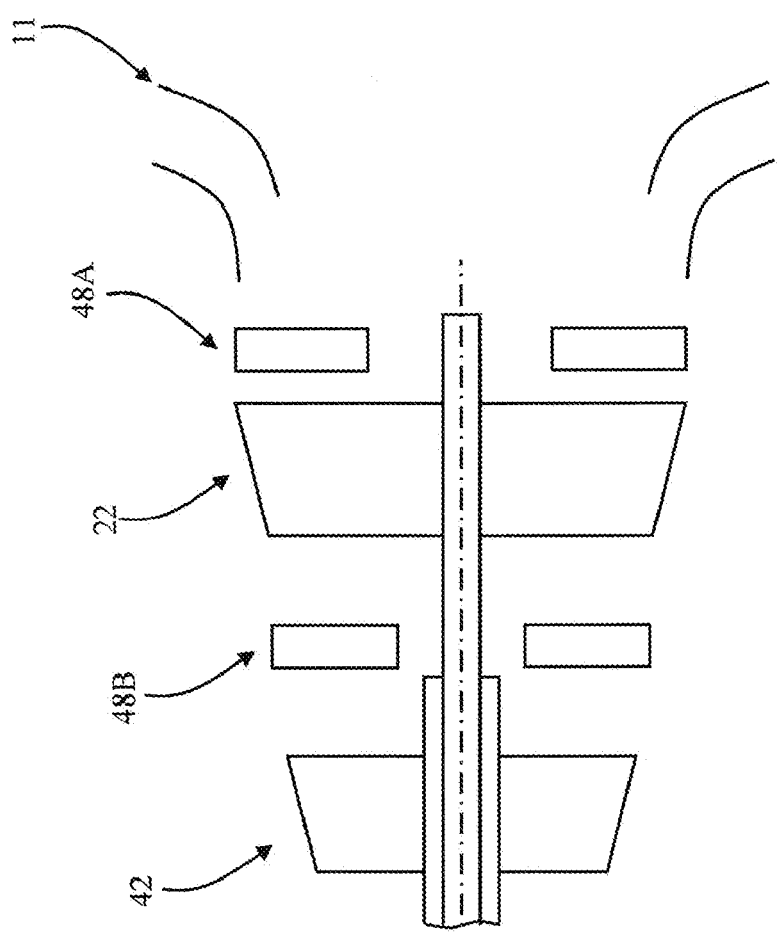
FIG. 3 is a schematic cross-sectional view of a portion of a gas turbine engine, according to another embodiment of the present disclosure.

The split compressor arrangement also allows bleed air to be drawn from between the HPC section 42 and the LPC section 22. More particularly, in the embodiment of FIG. 1, the engine 10 includes an inter-stage bleed 44 port or valve that is aft of the HPC section 42 and forward of the LPC section 22, which may provide for increased flexibility in the available bleed pressures. In a particular embodiment, the bleed pressure design point of the inter-stage bleed 44 is selected based on the pressure ratio of the LPC section 22, which runs independently from the HPC section 42. For operability, referring to FIG. 3, variable inlet guide vanes (VIGV) 48A and variable guide vanes (VGV) 48B can be used on the LPC section 22 and at the entry of the HPC section 42, together with the inter-stage bleed 44 (see FIG. 1).

Still referring to the embodiment shown in FIG. 1, the engine 10 also includes an accessory gearbox 50. The accessory gearbox 50 (sometimes referred to herein simply as "AGB 50") receives a rotational output and in turn drives accessories (e.g. fuel pump, starter-generator, oil pump, scavenge pump, etc.) that contribute to the functionality of the engine 10. The AGB 50 can be designed with side-facing accessories, top-facing accessories, or rear-facing accessories depending on the installation needs. The AGB 50 is aft of the air inlet 11. The engine 10 also has a tower shaft 51 that is mechanically coupled to a rear of the high pressure shaft 43 and driven thereby. An accessory gear box drive shaft 52 has a first geared end 52A mechanically coupled to the tower shaft 51, and a second geared end 52B mechanically coupled to the AGB 50. During operation of the engine 10, the high pressure shaft 43 transmits a rotational drive to the tower shaft 51 which in turn drives the accessory gearbox drive shaft 52 to thereby drive the accessories of the AGB 50. In the depicted embodiment, the accessory gearbox drive shaft 52 extends across the air inlet 11. This configuration of the accessory gearbox drive shaft 52 can take different forms. For example, it can be located outside the air inlet 11, or may be placed within the air inlet 11 along a strut of the air inlet 11. It can thus be appreciated that the second end 52B of the accessory gearbox drive shaft 52 meshes with an input gear of the AGB 50 to drive the AGB 50 across the air inlet 11.

Figure 2:
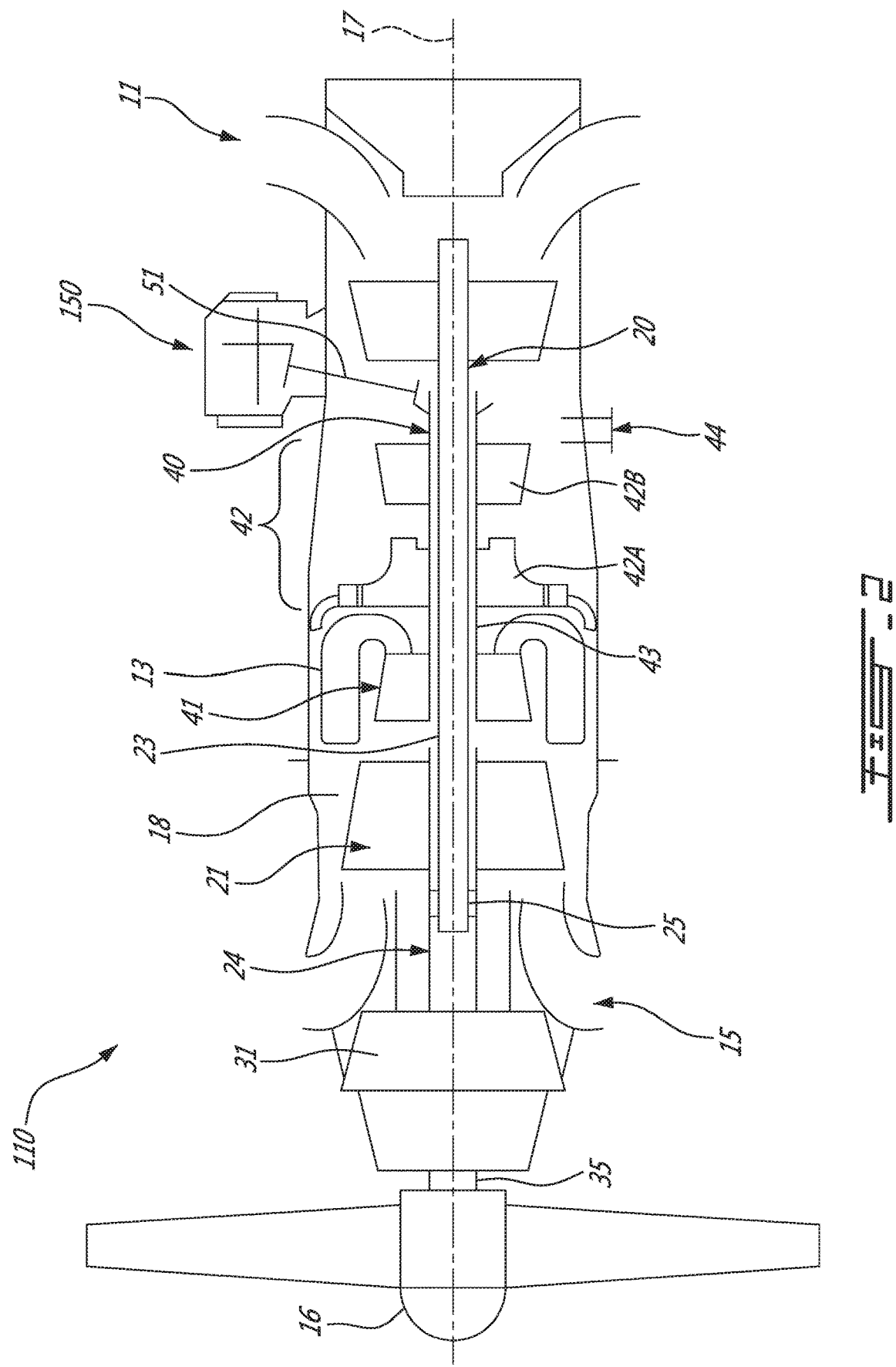
FIG. 2 is a schematic cross-sectional view of a gas turbine engine, according to another embodiment of the present disclosure.

The AGB 50 can be arranged relative to the core 18 of the engine 10 differently than as described above. Referring to FIG. 2, the embodiment of the engine 110 has an architecture and arrangement of turbomachinery similar to the engine 10 of FIG. 1, where similar elements are identified by the same reference numerals and will not be described further herein. FIG. 2 shows the AGB 150 mounted on the side of the engine 110, and forward of the air inlet 11. The circumferential angular position of the AGB 150 can be selected to suit specific installation needs. Other positions and arrangements for the AGB 150 are possible.

Referring to FIG. 1, there is also disclosed a method of operating the gas turbine engine 10. Air is drawn into the core 18 of the engine 10 via the air inlet 11 with the LPC section 22. The air from the LPC section 22 is further pressurized by the HPC section 42 disposed forward of the LPC section 22. The air is mixed with fuel and ignited in the combustor 13 to generate combustion gases. The HPC section 42 is driven by the HP turbine section 41 disposed forward of the combustor 13, and the HP turbine section 41 extracts energy from the combustion gases. The LPC section 22 is driven by the LP turbine section 21 disposed forward of the HP turbine section 41. The output drive shaft 24 and rotatable load are driven by the LP turbine section 21, and are located forward of the LP turbine section 21.

It can thus be appreciated that at least some of the embodiments of the engine 10,110 disclosed herein provide a mechanical architecture of turbomachinery that allows for a split compressor system. Such a split compressor reverse-flow engine 10,110 may be used for aircraft nose installations, as well as for wing installations.

The above description is meant to be exemplary only, and one skilled in the art will recognize that changes may be made to the embodiments described without departing from the scope of the invention disclosed. For example, although the engine 10,110 is described above as being a turboprop or a turboshaft, it will be appreciated that the engine 10,110 can have suitable (through-flow from front to rear) by-pass ducting and be used as a turbofan as well. Still other modifications which fall within the scope of the present invention will be apparent to those skilled in the art, in light of a review of this disclosure, and such modifications are intended to fall within the appended claims.

The invention claimed is:
1. A gas turbine engine, comprising:
a first spool rotatable about an axis, the first spool having
a low pressure compressor section in fluid communication with an air inlet, the low pressure compressor section including a first plurality of variable guide vanes in the low pressure compressor section; and
a low pressure turbine section drivingly engaged to the low pressure compressor section;
a second spool having
a high pressure compressor section in fluid communication with the low pressure compressor section to receive pressurized air therefrom, the high pressure compressor section including a second plurality of variable guide vanes at an entry of the high pressure compressor section; and
a high pressure turbine section drivingly engaged to the high pressure compressor section, the high pressure turbine section disposed upstream of the low pressure turbine section and in fluid communication therewith;
an output drive shaft drivingly engaged to the low pressure turbine section;
a rotatable load;
a gearbox, the output drive shaft drivingly engaging the rotatable load through the gearbox, and the low pressure turbine section located axially between the low pressure compressor section and the gearbox along the axis; and
an accessory gearbox disposed upstream of the air inlet, a tower shaft mechanically coupled to a high pressure shaft extending between the high pressure compressor section and the high pressure turbine section, and an accessory gearbox drive shaft having a first end mechanically coupled to the tower shaft and a second end mechanically coupled to the accessory gearbox.

2. The gas turbine engine as defined in claim 1, wherein the first spool includes a power shaft extending between the low pressure compressor section and the low pressure turbine section, the power shaft and the output drive shaft being co-axial and interconnected.

3. The gas turbine engine as defined in claim 1, wherein the accessory gearbox drive shaft extends across the air inlet.

4. The gas turbine engine as defined in claim 1, further comprising an inter-stage bleed disposed upstream of the high pressure compressor section and downstream of the low pressure compressor section.

5. The gas turbine engine as defined in claim 1, wherein the output drive shaft has a first segment extending between the low pressure compressor section and the low pressure turbine section, and a second segment extending from the low pressure turbine section to drivingly engage the rotatable load.

6. The gas turbine engine as defined in claim 1, wherein the rotatable load includes a propeller, and the gas turbine engine is a reverse-flow turboprop engine.

7. A method of operating a gas turbine engine, comprising:
drawing air into a core of the gas turbine engine through a low pressure compressor section through a first plurality of variable guide vanes disposed in the low pressure compressor section and then through a high pressure compressor section located downstream from the low pressure compressor section, the high pressure compressor section including a second plurality of variable guide vanes disposed at an entry of the high pressure compressor section, to provide pressurized air;
igniting a mixture of the pressurized air and fuel to generate combustion gases;
directing the combustion gases through a high pressure turbine section and then through a low pressure turbine section to drive the high pressure turbine section and the low pressure turbine section using the combustion gases;

driving the high pressure compressor section with the high pressure turbine section; and driving the low pressure compressor section and a rotatable load with the low pressure turbine section, the low pressure turbine section and the high pressure turbine section rotating independently from one another;

wherein the low pressure turbine section drives the rotatable load through a reduction gearbox, and the low pressure turbine section is located axially between the low pressure compressor section and the reduction gearbox along a longitudinal center axis of the gas turbine engine; and driving an accessory gearbox with the high pressure turbine section, the accessory gearbox disposed upstream of an air inlet in fluid communication with the low pressure compressor section;

wherein a tower shaft is mechanically coupled to a high pressure shaft extending between the high pressure compressor section and the high pressure turbine section, and an accessory gearbox drive shaft has a first end mechanically coupled to the tower shaft and a second end mechanically coupled to the accessory gearbox.

8. The method as defined in claim 7, wherein driving the low pressure compressor section and the rotatable load includes rotating a drive shaft driving the rotatable load, the drive shaft and the low pressure compressor section rotating at a same rotational speed.

9. The method as defined in claim 7, wherein driving the high pressure compressor section includes rotating the high pressure compressor section at a first rotational speed, and driving the low pressure compressor section includes rotating the low pressure compressor section at a second rotational speed different from the first rotational speed.

10. The method as defined in claim 7, wherein driving the accessory gearbox includes driving the accessory gearbox drive shaft.

11. The method as defined in claim 7, further comprising bleeding pressurized air from the core of the gas turbine engine at a location disposed upstream of the high pressure compressor section and downstream of the low pressure compressor section.

12. The method as defined in claim 7, wherein driving the rotatable load includes driving comprises a propeller through a reduction gear box.

13. A gas turbine engine, comprising:
a rotatable load;
a gearbox;
an output drive shaft having a front end configurable to drivingly engage the rotatable load through the gearbox;
a low pressure turbine section and a low pressure compressor section drivingly engaged to the output drive shaft, the low pressure turbine section disposed downstream of the low pressure compressor section, the low pressure compressor section including a first plurality of variable guide vanes at an inlet of the low pressure compressor section;
a high pressure shaft rotatable independently of the output drive shaft;
a high pressure turbine section and a high pressure compressor section drivingly engaged to the high pressure shaft, the high pressure compressor section disposed downstream of the low pressure compressor section and in fluid communication therewith, the high pressure compressor section including a second plurality of variable guide vanes at an inlet of the high pressure compressor section, and the high pressure turbine section disposed upstream of the low pressure turbine section and in fluid communication therewith;
wherein, during operation of the engine, air flows through the first plurality of variable guide vanes of the low pressure compressor, and then through the second plurality of variable guide vanes of the high pressure compressor, and combustion gases flow downstream through the high pressure turbine section and the low pressure turbine section; and
wherein the low pressure turbine section is axially between the low pressure compressor section and the gearbox along a longitudinal center axis of the gas turbine engine, and the high pressure turbine section is axially between the high pressure compressor section and the gearbox along the longitudinal center axis; and
an accessory gearbox disposed upstream of the low pressure compressor section, a tower shaft mechanically coupled to the high pressure shaft, and an accessory gearbox drive shaft having a first end mechanically coupled to the tower shaft and a second end mechanically coupled to the accessory gearbox.

14. The gas turbine engine as defined in claim 13, further comprising a power shaft mechanically coupled to the output drive shaft, the power shaft extending between the low pressure turbine section and the low pressure compressor section.

15. The gas turbine engine as defined in claim 13, wherein the accessory gearbox drive shaft extends across an air inlet communicating with the low pressure compressor section.

16. The gas turbine engine as defined in claim 13, further comprising an inter-stage bleed disposed upstream of the high pressure compressor section and downstream of the low pressure compressor section.

17. The gas turbine engine as defined in claim 13, wherein the output drive shaft is configurable to drivingly engage the rotatable load including a propeller, and the gas turbine engine is a reverse-flow turboprop engine.

* * * * *